(12) United States Patent
Stewart et al.

(10) Patent No.: US 8,726,880 B2
(45) Date of Patent: May 20, 2014

(54) ELECTRIC CAM PHASER CONTROL SYSTEMS AND METHODS

(75) Inventors: Etsuko Muraji Stewart, Laingsburg, MI (US); Vijay Ramappan, Novi, MI (US)

(73) Assignee: GM Global Technology Operations LLC

(*) Notice: Subject to any disclaimer, the term of this patent is extended or adjusted under 35 U.S.C. 154(b) by 524 days.

(21) Appl. No.: 13/161,862

(22) Filed: Jun. 16, 2011

(65) Prior Publication Data

US 2012/0318223 A1    Dec. 20, 2012

(51) Int. Cl.
*F02D 1/00* (2006.01)

(52) U.S. Cl.
USPC ........... 123/325; 123/345; 123/478; 123/480; 123/90.15

(58) Field of Classification Search
CPC .............................. F02D 41/123; F02M 3/045
USPC ......... 123/319, 321, 322, 325, 345–348, 350, 123/478, 480, 90.11, 90.15–90.17; 701/110, 112

See application file for complete search history.

(56) References Cited

U.S. PATENT DOCUMENTS

| 6,915,767 | B2 | 7/2005 | Pfeiffer et al. ............. 123/90.15 |
| 8,346,447 | B2 * | 1/2013 | Baur et al. ...................... 701/54 |
| 8,473,179 | B2 * | 6/2013 | Whitney et al. ............... 701/102 |
| 2007/0169731 | A1 | 7/2007 | Farah et al. | |

OTHER PUBLICATIONS

U.S. Appl. No. 13/074,446, Etsuko Muraji Stewart et al., Mar. 29, 2011.
U.S. Appl. No. 13/432,538, Stewart et al., Mar. 28, 2012.

* cited by examiner

*Primary Examiner* — John Kwon (57) ABSTRACT

A system for an engine includes a motor driver module, a target phase angle module, and a correlation control module. The motor driver module controls an electric motor of a camshaft phaser based on a target angle defined by a crankshaft position and a camshaft position. The target phase angle module selectively sets the target angle to a first phase angle before a deceleration fuel cutoff (DFCO) event and selectively transitions the target angle to a predetermined phase angle during the DFCO event. The correlation control module selectively compares a value of the crankshaft position with a predetermined crankshaft position range during the DFCO event.

20 Claims, 4 Drawing Sheets

ELECTRIC CAM PHASER CONTROL SYSTEMS AND METHODS

FIELD

The present disclosure relates to control systems and methods for engines and more particularly to electric cam phaser control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an internal combustion engine that combusts an air/fuel mixture within cylinders to produce drive torque. The engine may include pistons that reciprocate within the cylinders and that are coupled to a crankshaft. The pistons drive rotation of the crankshaft. The engine may also include a valve train that controls airflow into and out of the cylinders. The valve train may include one or more camshafts that selectively open and close intake valves and exhaust valves of the cylinders.

The camshaft(s) rotate with the crankshaft and control the timing of the opening and closing of the intake and exhaust valves relative to a position of the crankshaft. The valve train may further include one or more cam phasers coupled to the one or more camshafts and the crankshaft. The cam phaser(s) may adjust the rotational position of the camshaft(s) with respect to the position of the crankshaft.

SUMMARY

A system for an engine includes a motor driver module, a target phase angle module, and a correlation control module. The motor driver module controls an electric motor of a camshaft phaser based on a target angle defined by a crankshaft position and a camshaft position. The target phase angle module selectively sets the target angle to a first phase angle before a deceleration fuel cutoff (DFCO) event and selectively transitions the target angle to a predetermined phase angle during the DFCO event. The correlation control module selectively compares a value of the crankshaft position with a predetermined crankshaft position range during the DFCO event.

A method includes: controlling an electric motor of a camshaft phaser based on a target angle defined by a crankshaft position and a camshaft position; selectively setting the target angle to a first phase angle before a deceleration fuel cutoff (DFCO) event; selectively transitioning the target angle to a predetermined phase angle during the DFCO event; and selectively comparing a value of the crankshaft position with a predetermined crankshaft position range during the DFCO event.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Cam phasers are typically hydraulically actuated using oil pressurized by, for example, an oil pump driven by the engine. Pressurized oil may not be available under some circumstances, such as when the engine is not running. A biasing member (e.g., one or more springs) may bias a cam phaser against a mechanical end-stop and in a default position (e.g., fully retarded or fully advanced) when pressurized oil is not available. Therefore, a hydraulically actuated cam phaser will be parked in the default position when the engine is started. A hydraulically actuated cam phaser may remain in the default position after the engine is started until sufficient oil pressure is available to adjust the position of the cam phaser to a desired position.

Electrically-actuated cam phasers, however, do not rely on the availability of pressurized oil for actuation. Like hydraulic cam phasers, electric cam phasers can be parked at the default position after the engine is shutdown and left there for when the engine is started. Unlike hydraulic cam phasers, electric cam phasers can be parked and left at positions other than the default position for when the engine is started.

An engine control module monitors the position of the crankshaft and the position of the camshaft. The engine control module samples the crankshaft position when the camshaft position reaches predetermined positions. The engine control module compares the sampled crankshaft positions with predetermined ranges of crankshaft positions associated with the predetermined camshaft positions, respectively. When the crankshaft and the camshaft have been installed correctly and the camshaft and crankshaft position sensors are accurate, the crankshaft positions should be within the predetermined ranges, respectively.

The engine control module may compare the crankshaft positions with the predetermined ranges, respectively. The engine control module may take one or more remedial actions (e.g., setting a diagnostic trouble code or DTC, triggering a malfunction indicator lamp, etc.) when one or more of the crankshaft positions are not within the predetermined ranges, respectively.

In engine systems with a hydraulic cam phaser, the engine control module may determine whether the crankshaft positions correlate with the predetermined ranges within a predetermined period after the engine is started. The hydraulic cam phaser is in the default position during the predetermined period after the engine is started. In engine systems with an electric cam phaser, however, the cam phaser can be in a different position when the engine is started. The different position can be set, for example, to optimize engine operation when the engine is started.

The engine control module of the present disclosure determines whether the crankshaft positions correlate with the predetermined ranges when a deceleration fuel cutoff (DFCO) event is performed. A DFCO event may be initiated, for example, when a vehicle speed and an engine speed are greater than predetermined speeds (that are greater than zero) and a deceleration is greater than a predetermined deceleration.

Figure 1:
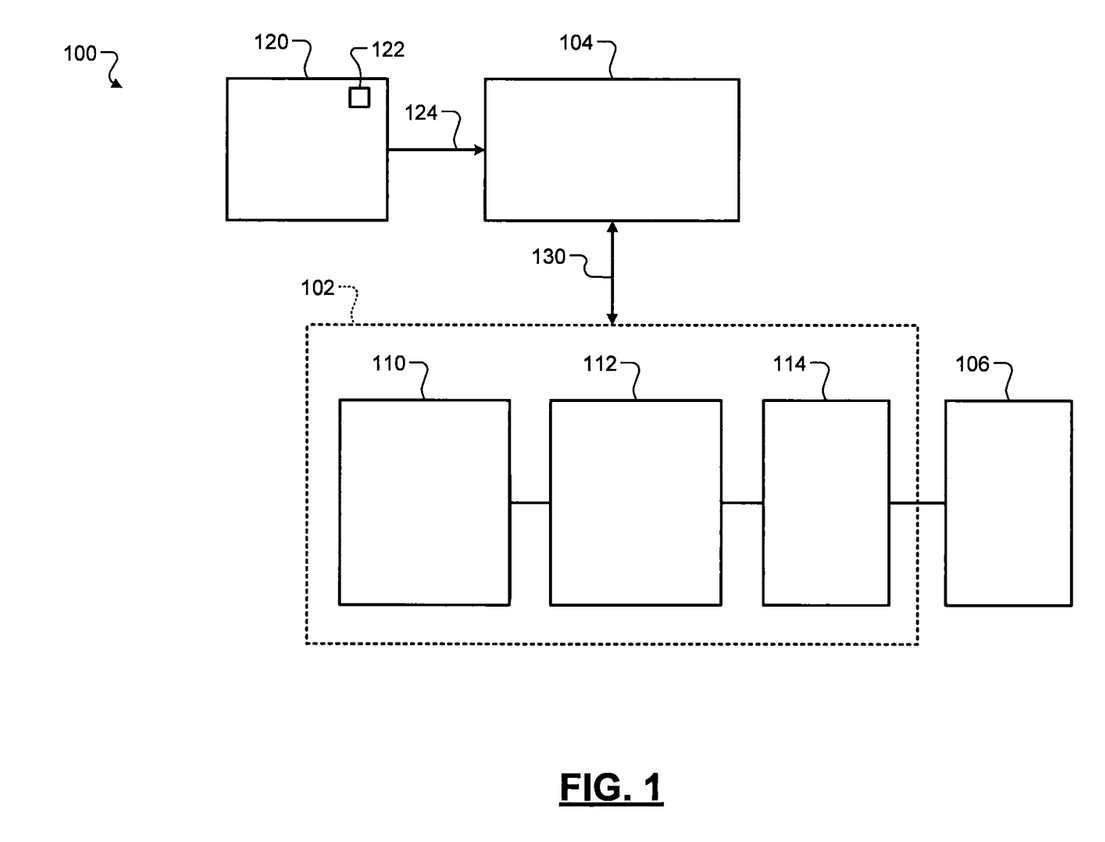
FIG. 1 is a functional block diagram of an example vehicle system according to the present disclosure.

Referring now to FIG. 1, a functional block diagram of an example vehicle system 100 is presented. The vehicle system 100 includes a powertrain 102 controlled by a powertrain control module 104. The powertrain 102 produces drive torque used to drive one or more wheels 106 of the vehicle. The powertrain 102 includes an engine system 110, a transmission 112, and a driveline 114.

The engine system 110 produces drive torque that is transmitted to the wheels 106 via the transmission 112 and the driveline 114. The present disclosure is not limited to transmissions or drivelines of a particular type. For example only, the transmission 112 may be an automatic transmission, a manual transmission, an automated manual transmission, or another suitable type of transmission.

The powertrain control module 104 controls operation of the powertrain 102 based on various driver inputs, vehicle operating conditions, and other vehicle system signals. The driver inputs may be received by driver interface modules 120 that generate driver signals in response to the driver inputs.

The driver interface modules 120 may include an ignition switch or button 122 that can be manipulated by the driver to start and shut down the vehicle. The ignition switch 122 may have multiple positions, for example, an OFF position, an ON position, and a CRANK position. The ignition switch 122 may output an ignition signal 124 indicative of the ignition switch position.

The driver interface modules 120 may further include, for example, an accelerator pedal (not shown) and a brake pedal (not shown) that can be manipulated by the driver. An accelerator pedal position signal and a brake pedal position signal may be generated based on the positions of the accelerator pedal and the brake pedal, respectively. The driver interface modules 120 may further include a cruise control system (not shown).

Various vehicle operating conditions and parameters are measured by sensors and/or determined as discussed in further detail below. The vehicle system signals include the driver signals and other signals 130 generated by the various components of the vehicle system 100.

Figure 2:
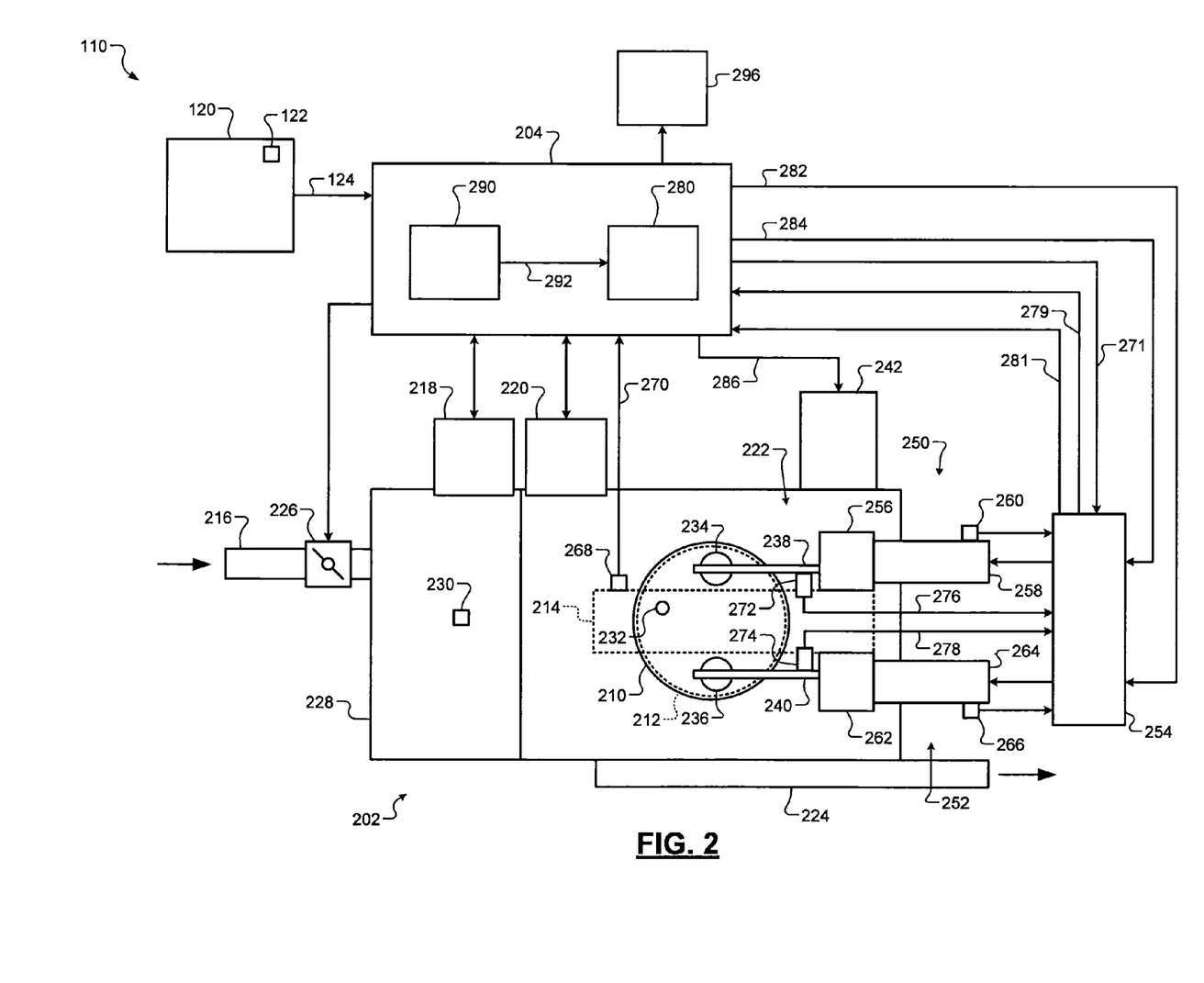
FIG. 2 is a functional block diagram of an example engine system according to the present disclosure.

Referring now to FIG. 2, a functional block diagram of an example implementation of the engine system 110 is presented. Generally, the engine system 110 includes an internal combustion engine (ICE) 202 that is controlled by an engine control module (ECM) 204 based on various driver inputs, engine operating conditions, and other vehicle system signals.

The ICE 202 produces drive torque by combusting an air/fuel mixture and may be one of several types. For example only, the ICE 202 may be a spark-ignition (SI) engine or a compression-ignition (CI) engine. The ICE 202 combusts the air/fuel mixture within a cylinder 210 of the engine. The ICE 202 is presented as a single cylinder engine for simplicity, but the ICE 202 can include more than one cylinder. A piston 212 reciprocates within the cylinder 210 between a top-dead-center (TDC) position and a bottom-dead-center (BDC) position. Combustion of the air/fuel mixture drives the piston 212, and the piston 212 drives rotation of a crankshaft 214.

The ICE 202 includes an intake system 216, a fuel system 218, an ignition system 220, a valve train 222, and an exhaust system 224. The intake system 216 controls air flow into the ICE 202. The intake system 216 may include a throttle 226 that controls airflow into an intake manifold 228. The throttle 226 may include a butterfly valve having a rotatable blade or another suitable type of throttle. Air is drawn into the cylinder 210 from the intake manifold 228.

The fuel system 218 supplies fuel to the ICE 202 and may include a fuel tank assembly (not shown) that contains the fuel and one or more fuel injectors that control an amount of the fuel supplied. In various implementations, such as central point injection and multi-point injection implementations, one or more fuel injectors may inject fuel into the intake system 216 upstream of the cylinder 210. In direct-injection implementations, one or more fuel injectors may inject fuel directly into the cylinder 210. For example purposes only, a single fuel injector 230 is shown that injects fuel into the intake system 216 upstream of the cylinder 210.

The ignition system 220 may supply energy for initiating combustion within the cylinder 210 in the form of a spark supplied by a spark plug 232 extending into the cylinder 210. In alternate implementations, such as CI engine implementations, the spark plug 232 may be omitted.

The valve train 222 includes at least one intake valve and one exhaust valve that are actuated by at least one camshaft. The valve train 222 may have one of several configurations, such as an overhead camshaft configuration or a cam-in-block configuration. For example only, the valve train 222 presented has an overhead camshaft configuration including an intake valve 234 and an exhaust valve 236 actuated by an intake camshaft 238 and an exhaust camshaft 240, respectively.

In an open position, the intake valve 234 allows air and fuel to enter the cylinder 210 via the intake system 216. In a closed position, the intake valve 234 closes the cylinder 210 to the intake system 216. In an open position, the exhaust valve 236 allows combustion gases to exit the cylinder 210 to the exhaust system 224. In a closed position, the exhaust valve 236 closes the cylinder 210 to the exhaust system 224. In various implementations, multiple intake valves and/or exhaust valves may be provided for each cylinder of the ICE 202.

The intake camshaft 238 and the exhaust camshaft 240 are coupled to and rotate with the crankshaft 214. The intake camshaft 238 and the exhaust camshaft 240 may be coupled to the crankshaft 214 via a chain or belt. In this manner, rotation of the intake camshaft 238 and the exhaust camshaft 240 are synchronized with rotation of the crankshaft 214.

The intake camshaft 238 controls the opening and closing of the intake valve 234 (i.e., intake valve timing). The intake camshaft 238 includes a cam lobe (not shown) that is associated with the intake valve 234. The cam lobe engages the intake valve 234 to control the opening and closing of the intake valve 234. In various implementations, the intake camshaft 238 may include an additional cam lobe (not shown) that is associated with the intake valve 234 and that has a different profile. One of the cam lobes may engage the intake valve 234 at a given time. The one of the low and high lift lobes that engages the intake valve 234 controls the amount (e.g., distance) that the intake valve 234 is opened (i.e., intake valve lift). For example only, the intake valve 234 may open to a first amount when a low lift lobe engages the intake valve 234, and the intake valve may open to a second amount when a high lift lobe engages the intake valve 234. The second amount is greater than the first amount. Other types of variable valve lift systems may be used.

A valve lift actuator module 242 may control the variable valve lift system. More specifically, the valve lift actuator module 242 controls the intake valve lift. For example only, the valve lift actuator module 242 may control the intake valve lift between low lift operation and high lift operation. The intake valve 234 may open to a maximum amount during high lift operation and open to a minimum amount during low lift operation. The valve lift actuator module 242 may also control the intake valve lift to one or more additional intake valve lift states between high and low lift operation.

The exhaust camshaft 240 controls the opening and closing of the exhaust valve 236. The exhaust camshaft 240 also includes a cam lobe (not shown). The cam lobe engages the exhaust valve 236 to control the opening and closing of the exhaust valve 236. As the first and second camshafts 238, 240 rotate, the lobes of the intake and exhaust camshafts 238 and 240 displace the intake and exhaust valves 234 and 236, respectively, between the open and closed positions.

The valve train 222 also includes a cam phaser system that selectively adjusts intake and/or exhaust valve timing by controlling phase angles between the crankshaft 214 and the intake and exhaust camshafts 238 and 240. The cam phaser system presented includes an intake phaser 250, an exhaust phaser 252, and a motor driver module 254.

The intake phaser 250 controls the intake valve timing by selectively adjusting the position of the intake camshaft 238 relative to the position of the crankshaft 214. The rotational position of the intake camshaft 238 relative to the position of the crankshaft 214 may be referred to as intake phase angle. The intake phaser 250 includes a gear train 256, an electric motor 258, and a position sensor 260. The gear train 256 includes a drive gear (not shown) in a meshed arrangement with a driven gear (not shown). The drive gear is coupled to the crankshaft 214, and the driven gear is coupled to the intake camshaft 238. In various arrangements, one or more intermediate gears may be interposed between the drive gear and the driven gear. Mechanical stops (not shown) may be built into the gear train 256.

The electric motor 258 is drivingly coupled to the gear train 256. Rotation of the electric motor 258 in a first rotational direction advances the intake phase angle (i.e., advances the intake camshaft position relative to the crankshaft position). Rotation of the electric motor 258 in a second (opposite) rotational direction retards the intake phase angle. The mechanical stops may prevent the electric motor 258 from advancing or retarding the intake camshaft 238 such that the intake phase angle would exceed a fully advanced angle or a fully retarded angle. In this manner, the mechanical stops establish what may be referred to as a phasing range or a phasing authority. The gear train 256 and the electric motor 258 may work together to maintain an intake phase angle. The position sensor 260 senses a rotational position of the electric motor 258 and outputs a signal indicative of the rotational position sensed.

The exhaust phaser 252 may control the exhaust valve timing by selectively adjusting the position of the exhaust camshaft 240 relative to the crankshaft position. The position of the exhaust camshaft 240 relative to the position of the crankshaft 214 may be referred to as exhaust phase angle. The exhaust phaser 252 may be structurally and functionally similar to the intake phaser 250. The exhaust phaser 252 includes a gear train 262, an electric motor 264, and a position sensor 266 substantially similar to the gear train 256, the electric motor 258, and the position sensor 260 discussed above.

The motor driver module 254 controls the intake phase angle and the exhaust phase angle via the electric motors 258 and 264 based on various inputs. The inputs include various control values received from the ECM 204, including a desired intake phase angle 282 and a desired exhaust phase angle 284. The motor driver module 254 adjusts the intake and exhaust phase angles via the electric motors 258 and 264, respectively, to achieve the desired intake and exhaust phase angles 282 and 284. The motor driver module 254 may determine present values of the intake and exhaust phase angles to determine how to operate the electric motors 258 and 264 to achieve the desired intake and exhaust phase angles 282 and 284. In various implementations, the motor driver module 254 may be integrated within the ECM 204.

A crankshaft position sensor 268 may sense a rotational position of the crankshaft 214 and generate a crankshaft position signal (CPS) 270 based on the crankshaft rotational position sensed. For example only, the CPS may include a train of pulses where the crankshaft position sensor 268 generates a pulse in the pulse train as a tooth of a first toothed wheel that rotates with the crankshaft 214 passes the crankshaft position sensor 268. The ECM 204 may determine the crankshaft position 271 by counting the pulses in the CPS 270. The crankshaft position 271 may correspond to the present position of the crankshaft 214.

Camshaft position sensors 272 and 274 may sense rotational positions of the intake and exhaust camshafts 238 and 240, respectively. The camshaft position sensors 272 and 274 output camshaft position signals 276 and 278 indicative of the intake and exhaust camshaft rotational positions sensed, respectively.

The motor driver module 254 may determine the intake camshaft position 279 by counting the pulses in the camshaft position signal 276. The motor driver module 254 may determine the exhaust camshaft position 281 by counting pulses in the camshaft position signal 278. The intake and exhaust camshaft positions 279 and 281 may correspond to the present positions of the intake and exhaust camshafts 238 and 240.

The motor driver module 254 may determine the present values of the intake and exhaust phase angles based on the crankshaft position 271 and the intake and exhaust camshaft positions 279 and 281, respectively. When making adjustments, the motor driver module 254 may control operation of the electric motors 258 and 264 additionally or alternatively based on the outputs of the position sensors 260 and 266. The intake and exhaust phasers 250 and 252 may therefore be adjusted to achieve the desired intake and exhaust phase angles 282 and 284 at the appropriate time.

The ECM 204 controls operation of the ICE 202 and engine torque output. The ECM 204 may control the engine torque output by controlling various engine operating parameters including mass air flowrate (MAF), the air/fuel mixture, spark timing, valve timing, valve lift, and one or more suitable engine operating parameters.

For example only, the ECM 204 may include a valve control module 280 that generates the desired intake phase angle 282, the desired exhaust phase angle 284, and a desired valve lift 286. The motor driver module 254 may control the electric motors 258 and 264 based on the desired intake and exhaust phase angles 282 and 284, respectively. The valve lift actuator module 242 may control intake valve lift based on the desired valve lift 286.

The ECM 204 may also include a deceleration fuel cutoff (DFCO) module 290 that controls the performance of DFCO events. Provision of fuel to the ICE 202 is disabled during a DFCO event. Disabling the provision of fuel to the ICE 202 may be performed to, for example, increase fuel economy. While the provision of fuel is disabled during a DFCO event, the ICE 202 continues to pump air through the ICE 202. Drawing air into the ICE 202, compressing air within the cylinder(s) of the ICE 202, and expelling air from the ICE 202 may apply a braking (i.e., negative) torque on the crankshaft 214. In other words, torque losses attributable to engine pumping (i.e., pumping losses) occur during a DFCO event.

The DFCO module 290 may generate a DFCO signal 292 for a DFCO event. For example only, the DFCO module 290 may set the DFCO signal 292 to an active state to initiate a DFCO event when one or more DFCO enabling conditions are satisfied and maintain the DFCO signal 292 in the active state until one or more DFCO disabling conditions are satisfied. The DFCO module 290 may transition the DFCO signal 292 to an inactive state and end the DFCO event when the one or more DFCO disabling conditions are satisfied.

The valve control module 280 may receive the DFCO signal 292. When a DFCO event is initiated, the valve control module 280 transitions the desired intake phase angle 282 to a predetermined phase angle, such as the fully advanced angle, the fully retarded angle, or another suitable phase angle. While the principles of the present disclosure may also be applicable to the exhaust camshaft 240, for purposes of discussion only, the present disclosure will be described in conjunction with the intake camshaft 238 and the desired intake phase angle 282.

When the desired intake phase angle 282 is at or transitioning to the predetermined phase angle, the valve control module 280 samples the crankshaft position 271 when the intake camshaft position 279 reaches predetermined positions. The valve control module 280 diagnoses the presence of a fault based on whether the samples of the crankshaft position 271 are within the predetermined crankshaft position ranges, respectively. The presence of the fault may be attributable to, for example, the crankshaft 214 and/or the intake camshaft 238 being installed incorrectly within the ICE 202, inaccuracy in the crankshaft position sensor 268 and/or the intake camshaft position sensor 260, and/or one or more other sources are associated with determining a desired intake phase angle. The ECM 204 selectively illuminates an indicator 296 (e.g., a malfunction indicator lamp or MIL), generate signal (e.g., a diagnostic trouble code), disable one or more other features or fault diagnostics, and/or take one or more other remedial actions based on the determination.

Figure 3:
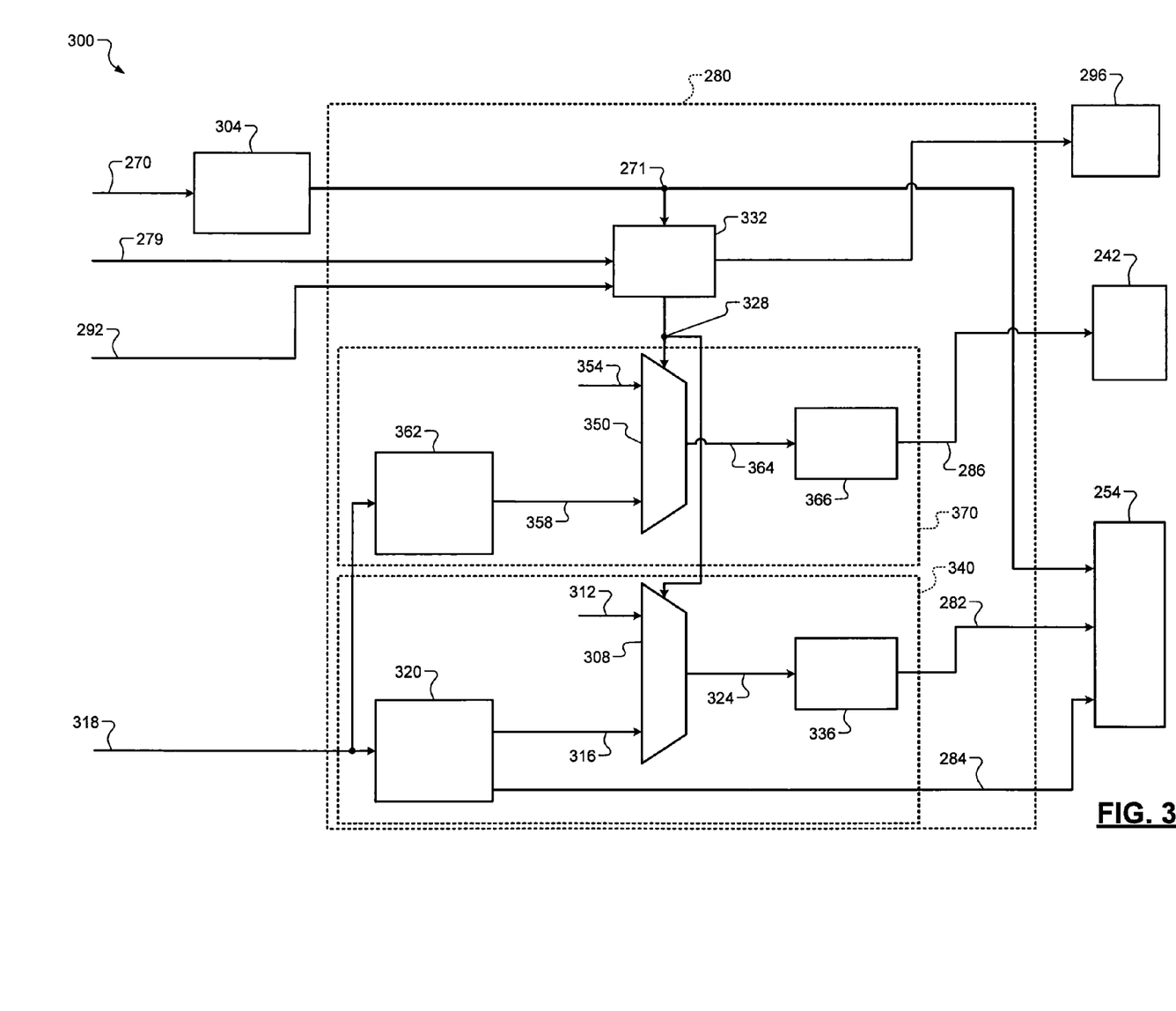
FIG. 3 is a functional block diagram of an example valve control system according to the present disclosure.

Referring now to FIG. 3, a functional block diagram of an example implementation of a valve control system 300 is presented. A crankshaft position determination module 304 may receive the CPS 270 from the crankshaft position sensor 268. The crankshaft position determination module 304 may determine the crankshaft position 271 based on the pulses in the CPS 270.

A first selection module 308 may receive a predetermined phase angle 312 and a commanded phase angle 316. The predetermined phase angle 312 and the commanded phase angle 316 may be used in setting the desired intake phase angle 282. The predetermined phase angle 312 is a predetermined value for the angle between the crankshaft position 271 and the intake camshaft position 279. The predetermined phase angle 312 may be calibrated and stored in memory (not shown). The predetermined phase angle 312 may correspond to the fully advanced angle, the fully retarded angle, or another suitable angle between the fully advanced and retarded angles.

A position command module 320 may determine and output the commanded phase angle 316. For example only, the position command module 320 may determine the commanded phase angle 316 based on driver inputs 318, such as the accelerator pedal position, the brake pedal position, and/or cruise control inputs. The position command module 320 may determine the commanded phase angle 316 additionally or alternatively based on one or more other suitable inputs.

The first selection module 308 outputs one of the predetermined phase angle 312 and the commanded phase angle 316 as a selected phase angle 324. The first selection module 308 selects which one of the predetermined phase angle 312 and the commanded phase angle 316 to output as the selected phase angle 324 based on a selection signal 328. For example only, the first selection module 308 may output the predetermined phase angle 312 as the selected phase angle 324 when the selection signal 328 is in a first state. The first selection module 308 may output the commanded phase angle 316 as the selected phase angle 324 when the selection signal 328 is in a second state.

A correlation control module 332 may generate the selection signal 328. The correlation control module 332 may selectively set the selection signal 328 to the first state when the DFCO signal 292 is in the active state. The correlation control module 332 may set the selection signal 328 to the second state when the DFCO signal 292 is in the inactive state. In this manner, the first selection module 308 may output the predetermined phase angle 312 as the selected phase angle 324 during a DFCO event. The first selection module 308 may output the commanded phase angle 316 as the selected phase angle 324 when a DFCO event is not occurring.

A rate limiter module 336 may receive the selected phase angle 324 and output the desired intake phase angle 282 based on the selected phase angle 324. For example only, the rate limiter module 336 may adjust the desired intake phase angle 282 toward the selected phase angle 324 at up to a predetermined rate. For example only, the predetermined rate may be approximately 50 crankshaft angle degrees (CAD) per second or another suitable rate.

In various implementations, the rate limiter module 336 may be omitted. In such implementations, the first selection module 308 may output the selected one of the predetermined phase angle 312 and the commanded phase angle 316 as the desired intake phase angle 282.

In other implementations, the first selection module 308 may also be omitted. In such implementations, the position command module 320 may adjust the commanded phase angle 316 toward the predetermined phase angle 312 at a predetermined rate or set the commanded phase angle 316 equal to the predetermined phase angle 312 in response to the selection signal 328 transitioning from the second state to the first state. A target phase angle module 340 may include the position command module 320, the first selection module 308, and/or the rate limiter module 336.

Referring again to the correlation control module 332, the correlation control module 332 may also selectively set the selection signal 328 to the second state when performance of a correlation event between the crankshaft position 271 and the intake camshaft position 279 is complete. The correlation control module 332 may initiate the performance of a correlation event in response to the DFCO signal 292 transitioning from the inactive state to the active state. The correlation control module 332 may additionally or alternatively initiate the performance of a correlation event when non-volatile memory (NVM) of the ECM 204 has been reset or re-flashed.

The correlation control module 332 may perform the correlation event based on the intake camshaft position 279 and the crankshaft position 271. The correlation control module 332 may perform the correlation event based on values of the crankshaft position 271 taken when the intake camshaft position 279 reaches predetermined positions, respectively, during an engine cycle. In various engine systems, one engine cycle may refer to each of the cylinders of the engine undergoing one complete engine cycle. For example only, one engine cycle may refer to 720 degrees of rotation of the crankshaft 214 (i.e., 2 crankshaft revolutions). In this manner, one engine cycle also refers to 720 degrees of rotation of the intake camshaft 238 (i.e., 2 camshaft rotations). The predetermined intake camshaft positions may be, for example, approximately every 180 degrees of camshaft rotation, as indicated by a tooth having a predetermined tooth profile passing the camshaft position sensor 272.

A predetermined crankshaft position range is associated with each of the predetermined intake camshaft positions for purposes of the correlation event. For example only, a predetermined crankshaft position range of 17 degrees to 37 degrees (i.e., 27 degrees+/−10 degrees) may be associated with a predetermined intake camshaft position of 10 degrees.

The correlation control module 332 obtains the values of the crankshaft position 271 when the intake camshaft position 279 reaches the predetermined intake camshaft positions, respectively, during the correlation event. The correlation control module 332 compares the values of the crankshaft position 271 with the predetermined crankshaft position ranges associated with the predetermined intake camshaft positions, respectively. The correlation control module 332 may determine whether the crankshaft position 271 and the intake camshaft position 279 correlate based on whether the values of the crankshaft position 271 are within the predetermined crankshaft position ranges, respectively. For example only, the correlation control module 332 may determine that the crankshaft position 271 and the intake camshaft position 279 do not correlate when one or more of the values of the crankshaft position 271 are not within the predetermined crankshaft position ranges, respectively. The crankshaft position 271 and the intake camshaft position 279 not correlating may indicate that the crankshaft 214 and/or the intake camshaft 238 is/are not properly installed within the ICE 202 or that the sensors and actuators that contribute to the intake phase angle are performing reliably.

The correlation control module 332 may take one or more remedial actions when the crankshaft position 271 and the intake camshaft position 279 do not correlate. For example only, the correlation control module 332 may set the selection signal 328 to the first state, even after the DFCO signal 292 transitions to the inactive state. This maintains the desired intake phase angle 282 at the predetermined phase angle 312 even after the DFCO event ends. The correlation control module 332 may also trigger illumination of the indicator 296, set a code/flag in memory (e.g., a diagnostic trouble code) associated with a failed correlation event that indicates that the crankshaft position 271 and the intake camshaft position 279 do not correlate. The correlation control module 332 may additionally or alternatively take one or more other remedial actions.

When the values of the crankshaft position 271 are within the predetermined crankshaft position ranges, respectively, the correlation control module 332 may transition to the selection signal 328 to the second state. The correlation control module 332 may transition the selection signal 328 to the second state even before the DFCO signal 292 transitions to the inactive state. In this manner, the desired intake phase angle 282 can be adjusted to the commanded phase angle 316.

The valve control module 280 may also include a second selection module 350 that may receive a predetermined valve lift 354 and a commanded valve lift 358. The predetermined valve lift 354 and the commanded valve lift 358 may be used in setting the desired valve lift 286. The predetermined valve lift 354 may be calibrated and stored in memory (not shown). The predetermined valve lift 354 may correspond to the high lift position, the low lift position, or another suitable lift position between the high lift position and the low lift position.

A lift command module 362 may determine and output the commanded valve lift 358. For example only, the lift command module 362 may determine the commanded valve lift 358 based on the driver inputs 318, such as the accelerator pedal position, the brake pedal position, and/or cruise control inputs. The lift command module 362 may determine the commanded valve lift 358 additionally or alternatively based on one or more other suitable inputs.

The second selection module 350 may output one of the predetermined valve lift 354 and the commanded valve lift 358 as a selected valve lift 364. The second selection module 350 selects which one of the predetermined valve lift 354 and the commanded valve lift 358 to output as the selected valve lift 364 based on the selection signal 328. For example only, the second selection module 350 may output the predetermined valve lift 354 as the selected valve lift 364 when the selection signal 328 is in the first state. The second selection module 350 may output the commanded valve lift 358 as the selected valve lift 364 when the selection signal 328 is in the second state.

A rate limiter module 366 may receive the selected valve lift 364 and output the desired valve lift 286 based on the selected valve lift 364. For example only, the rate limiter module 366 may adjust the desired valve lift 286 toward the selected valve lift 364 at up to a predetermined rate. In various implementations, the rate limiter module 336 may be omitted. In such implementations, the second selection module 350 may output the one of the predetermined valve lift 354 and the commanded valve lift 358 as the desired valve lift 286.

In other implementations, the second selection module 350 may also be omitted. In such implementations, the lift command module 362 may adjust the commanded valve lift 358 toward the predetermined valve lift 354 at a predetermined rate or set the commanded valve lift 358 equal to the predetermined valve lift 354 when the selection signal 328 is in the first state. A target lift module 370 may include the lift command module 362, the second selection module 350, and/or the rate limiter module 366.

Figure 4:
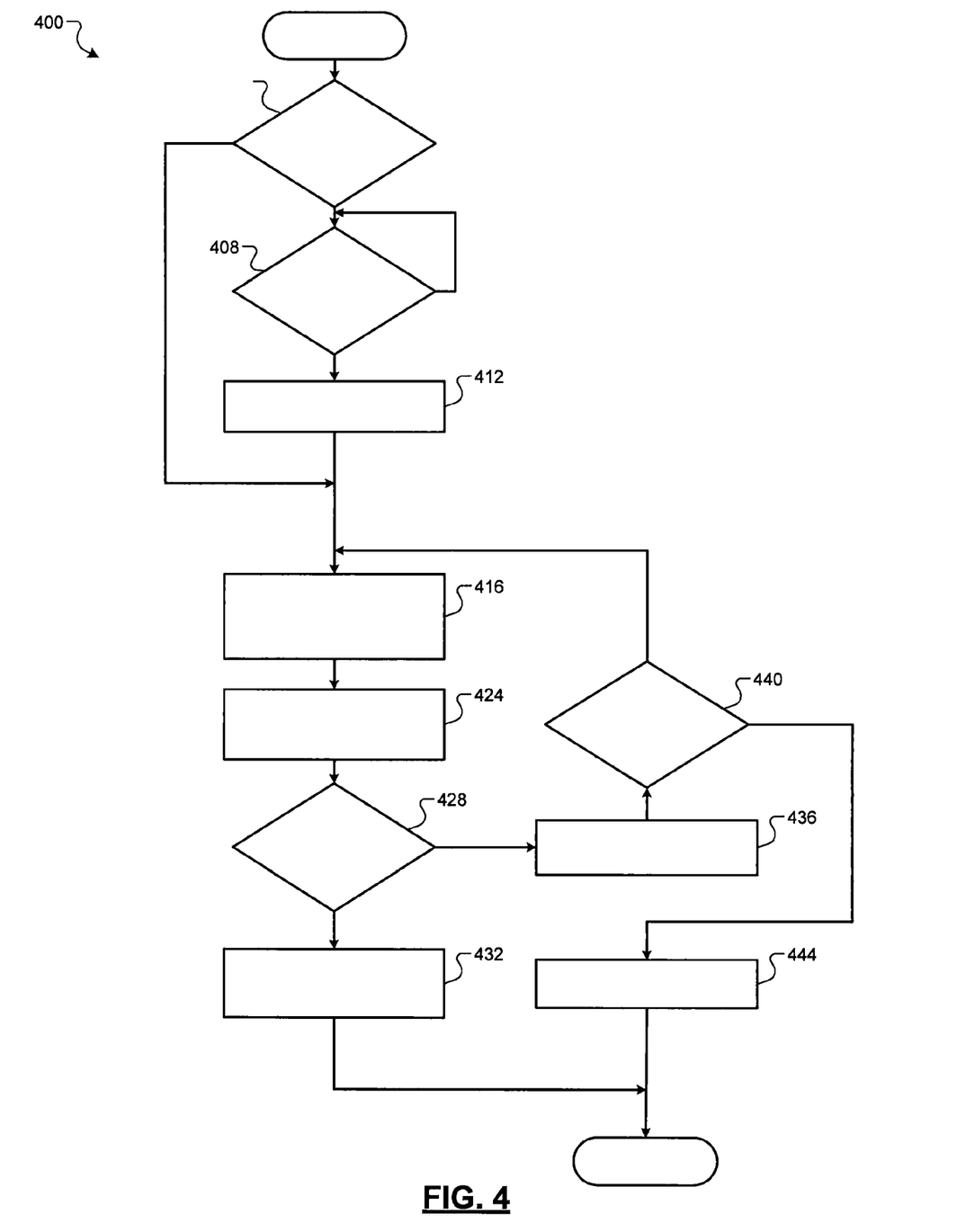
FIG. 4 is a flowchart depicting an example method of controlling valve opening and closing according to the present disclosure.

Referring now to FIG. 4, a flowchart depicting an example method 400 of controlling valve opening and closing is presented. When the vehicle is started (e.g., key ON), control may begin with 404 where control determines whether the NVM of the ECM 204 has been reset or re-flashed. If false, control may continue with 408; if true, control may proceed to 416, which is discussed further below.

At 408, control determines whether to initiate a DFCO event. If true, control may disable the provision of fuel to the ICE 202 at 412 and continue with 416. If false, control may return to 408. For example only, control may initiate a DFCO event when the vehicle speed is greater than a predetermined speed (that is greater than zero), the engine speed is greater than a predetermined speed (that is greater than zero), and a deceleration is greater than a predetermined deceleration. The deceleration may be, for example, based on a driver desired deceleration (e.g., driver torque request, accelerator pedal position, etc.), and/or another suitable vehicle deceleration parameter. For example only, the deceleration may be greater than the predetermined deceleration when the accelerator pedal position is less than a predetermined position.

At 416, control controls the intake phaser 250 based on the predetermined phase angle 312. For example only, control may transition the desired intake phase angle 282 to the predetermined phase angle 312 and control the intake phaser 250 to achieve the desired intake phase angle 282. Control may rate limit the transition of the desired intake phase angle 282 to the predetermined phase angle 312. Control may also control the valve lift actuator module 242 based on the predetermined valve lift 354 at 416. Prior to transitioning the desired intake phase angle 282 and the desired valve lift 286 to the predetermined phase angle 312 and the predetermined valve lift 354, control may set the desired intake phase angle 282 and the desired valve lift 286 based on the commanded phase angle 316 and the commanded valve lift 358, respectively.

At 424, control initiates performance of a correlation event. During the correlation event, control determines the values of the crankshaft position 271 when the intake camshaft position 279 reaches the predetermined camshaft positions, respectively. Control compares the values of the crankshaft position 271 with predetermined crankshaft position ranges associated with the predetermined camshaft positions, respectively.

Control determines whether the crankshaft position 271 correlates with the intake camshaft position 279 at 428. More specifically, control may determine whether the values of the crankshaft position 271 are within the predetermined crankshaft position ranges associated with the predetermined camshaft positions, respectively, at 428. If true, control may control the intake phaser 250 based on the commanded phase angle 316 at 432 and control may end until a next vehicle startup event. If false, control may transfer to 436. One or more of the values of the crankshaft position 271 not being within the predetermined crankshaft position ranges, respectively, may indicate that the crankshaft 214 and/or the intake camshaft 238 is improperly installed.

At 436, control may increment a counter value. The counter value may track the number of times (e.g., engine cycles) that control has determined that the crankshaft position 271 does not correlate with the intake camshaft position 279. Control may determine whether the counter value is greater than a predetermined value at 440. If true, control may take one or more remedial actions at 444 and control may end until a next time that the driver actuates the button, key, etc. to start the vehicle. For example only, the predetermined value may be approximately 3. The remedial actions may include, for example, illuminating the indicator 296, setting the DTC, maintaining control of the intake phaser 250 based on the predetermined phase angle 312, and/or one or more other suitable remedial actions.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for an engine, comprising:
 a motor driver module that controls an electric motor of a camshaft phaser based on a target angle defined by a crankshaft position and a camshaft position;
 a target phase angle module that selectively sets the target angle to a first phase angle before a deceleration fuel cutoff (DFCO) event and that selectively transitions the target angle to a predetermined phase angle during the DFCO event; and
 a correlation control module that selectively compares a value of the crankshaft position with a predetermined crankshaft position range during the DFCO event.

2. The system of claim 1 further comprising a DFCO module that selectively initiates the DFCO event and disables provision of fuel to the engine when an engine speed is greater than a first predetermined speed, a vehicle speed is greater than a second predetermined speed, and an accelerator pedal position is less than a predetermined position.

3. The system of claim 1 further comprising:
 a valve lift actuator module that controls lift of at least one valve of the engine based on a target lift value; and
 a target lift module that selectively sets the target lift value to a first lift value before the DFCO event and that transitions the target lift value to a predetermined lift value during the DFCO event.

4. The system of claim 1 wherein the target phase angle module includes a rate limiter module that transitions the target angle toward the predetermined phase angle at a predetermined rate.

5. The system of claim 1 wherein the correlation control module illuminates an indicator lamp when the value of the crankshaft position is outside of the predetermined crankshaft position range.

6. The system of claim 1 wherein the correlation control module sets a predetermined code when the value of the crankshaft position is outside of the predetermined crankshaft position range.

7. The system of claim 1 wherein the camshaft is one of an intake camshaft and an exhaust camshaft.

8. The system of claim 1 wherein, when the value of the crankshaft position is outside of the predetermined crankshaft position range, the correlation control module maintains the target angle at the predetermined phase angle after the DFCO event ends and fueling is re-enabled.

9. The system of claim 1 wherein the target phase angle module selectively transitions the target angle from the predetermined phase angle to the first phase angle when the value of the crankshaft position is within the predetermined crankshaft position range.

10. The system of claim 9 wherein the target phase angle module selectively transitions the target angle from the predetermined phase angle to the first phase angle before the DFCO event ends.

11. A method comprising:
controlling an electric motor of a camshaft phaser based on a target angle defined by a crankshaft position and a camshaft position;
selectively setting the target angle to a first phase angle before a deceleration fuel cutoff (DFCO) event;
selectively transitioning the target angle to a predetermined phase angle during the DFCO event; and
selectively comparing a value of the crankshaft position with a predetermined crankshaft position range during the DFCO event.

12. The method of claim 11 further comprising selectively initiating the DFCO event and disabling provision of fuel to an engine when an engine speed is greater than a first predetermined speed, a vehicle speed is greater than a second predetermined speed, and an accelerator pedal position is less than a predetermined position.

13. The method of claim 11 further comprising:
controlling lift of at least one valve of an engine based on a target lift value;
selectively setting the target lift value to a first lift value before the DFCO event; and
transitioning the target lift value to a predetermined lift value during the DFCO event.

14. The method of claim 11 further comprising transitioning the target angle toward the predetermined phase angle at a predetermined rate.

15. The method of claim 11 further comprising illuminating an indicator lamp when the value of the crankshaft position is outside of the predetermined crankshaft position range.

16. The method of claim 11 further comprising setting a predetermined code when the value of the crankshaft position is outside of the predetermined crankshaft position range.

17. The method of claim 11 wherein the camshaft is one of an intake camshaft and an exhaust camshaft.

18. The method of claim 11 further comprising, when the value of the crankshaft position is outside of the predetermined crankshaft position range, maintaining the target angle at the predetermined phase angle after the DFCO event ends and fueling is re-enabled.

19. The method of claim 11 further comprising selectively transitioning the target angle from the predetermined phase angle to the first phase angle when the value of the crankshaft position is within the predetermined crankshaft position range.

20. The method of claim 19 further comprising selectively transitioning the target angle from the predetermined phase angle to the first phase angle before the DFCO event ends.

* * * * *